United States Patent [19]

Truax

[11] Patent Number: 5,056,256
[45] Date of Patent: Oct. 15, 1991

[54] ROD-MOUNTABLE FISHING TACKLE HOLDER

[76] Inventor: Afred J. Truax, 38530 Orangelawn, Livonia, Mich. 48150

[21] Appl. No.: 514,924

[22] Filed: Apr. 26, 1990

[51] Int. Cl.⁵ .............................................. A01K 87/00
[52] U.S. Cl. .......................................... 43/25.2; 43/26
[58] Field of Search ...................... 43/25.2, 20, 22, 23, 43/25, 26

[56] References Cited

U.S. PATENT DOCUMENTS

| | | | |
|---|---|---|---|
| 2,285,883 | 6/1942 | Benton | 43/25.2 |
| 2,691,840 | 10/1954 | Smith | 43/25.2 |
| 2,829,461 | 4/1958 | Tuttle | 43/25.2 |
| 3,418,742 | 12/1968 | Yaklyvich | 43/25.2 |
| 3,711,985 | 1/1973 | Winters | 43/25.2 |
| 4,203,245 | 5/1980 | Peterson | 43/25.2 |
| 4,667,433 | 5/1987 | Thompson | 43/25.2 |
| 4,681,220 | 7/1987 | Beneke | 43/25.2 |

FOREIGN PATENT DOCUMENTS

| | | | |
|---|---|---|---|
| 451165 | 9/1948 | Canada | 43/25.2 |
| 732817 | 4/1966 | Canada | 43/25.2 |

Primary Examiner—Richard K. Seidel
Assistant Examiner—Chuck Y. Mah
Attorney, Agent, or Firm—Weintraub, DuRoss & Brady

[57] ABSTRACT

A rod-mountable fishing tackle holder is formed as a unitary body with a hollow cylindrical passage formed longitudinally therein for holding lures and an axial slit formed in the body for retaining fishing tackle or allowing passage of fishing line therethrough. A cylindrical handle of a fishing rod fits into the cylindrical passage of the tackle holder. Attached to the main body of the tackle holder may be one or more resilient clips for alternatively attaching the tackle holder to the rod shaft. Alternatively, the holder may be integrally formed with the rod handle.

12 Claims, 2 Drawing Sheets

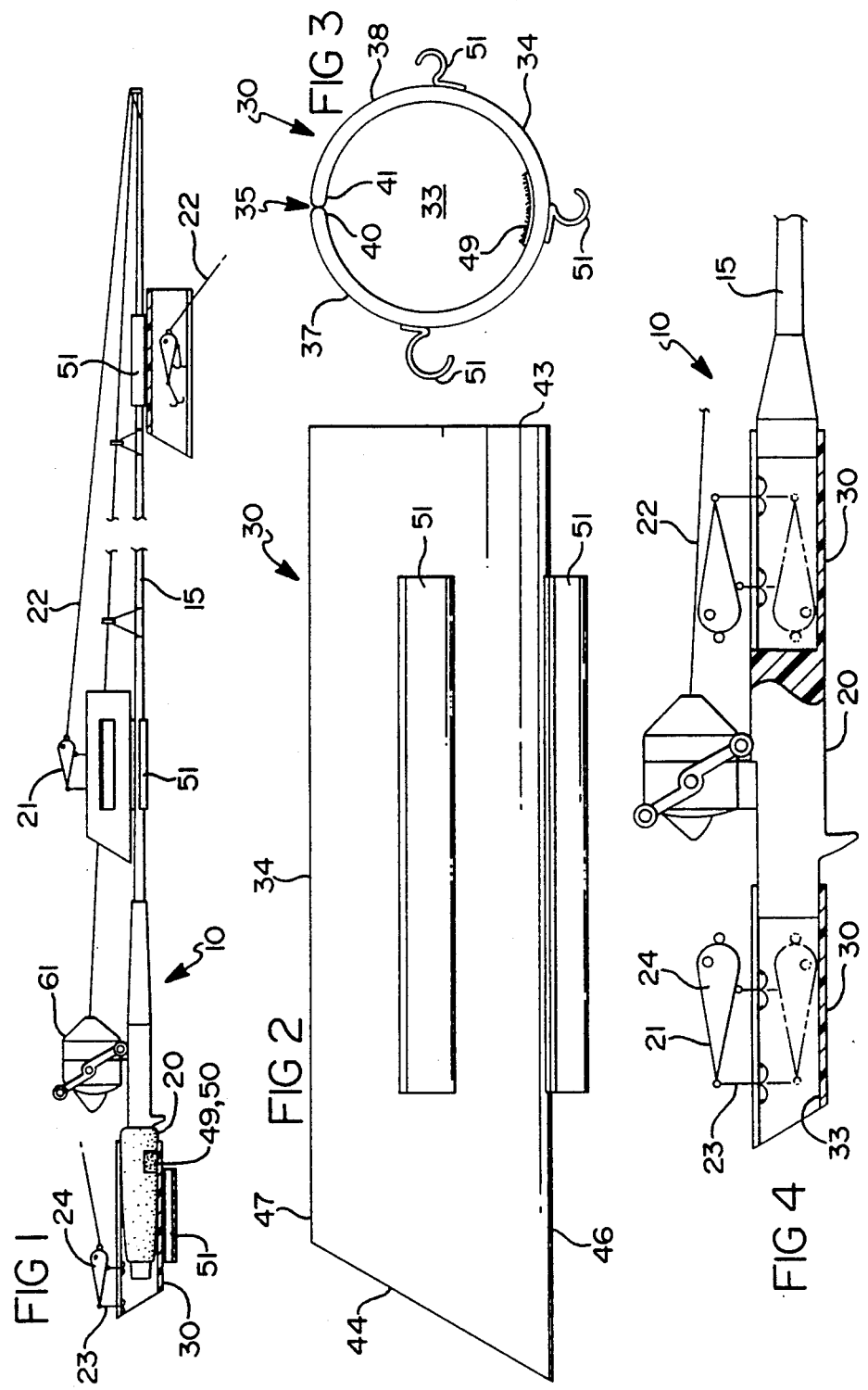

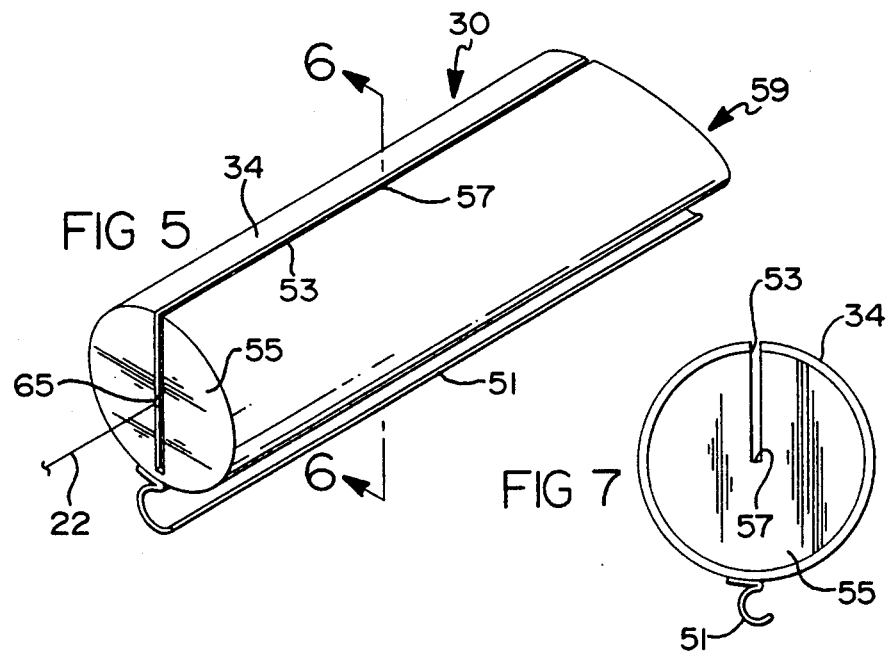
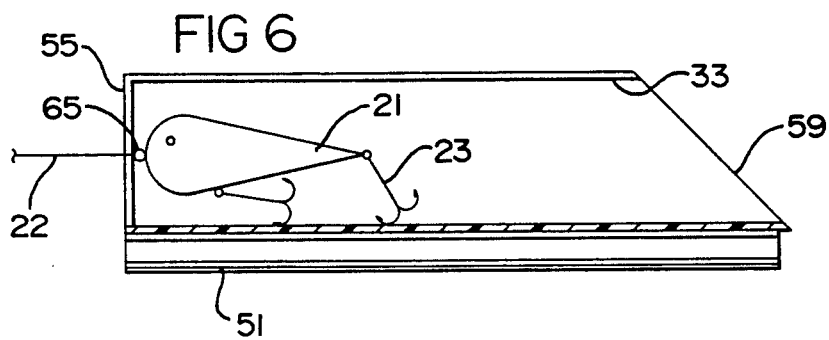
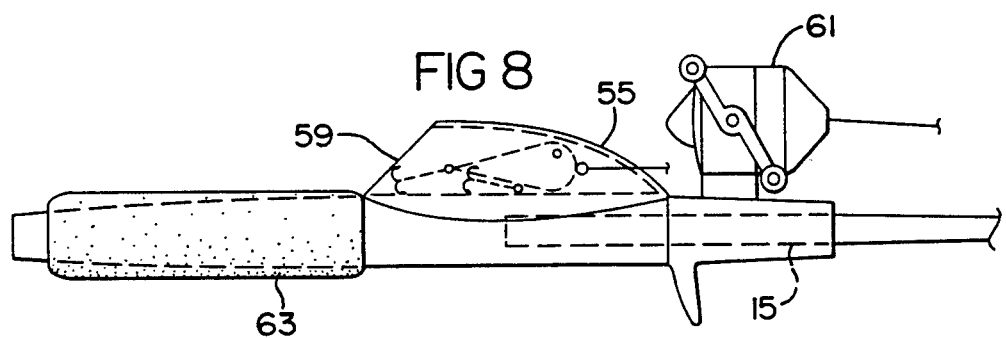

ROD-MOUNTABLE FISHING TACKLE HOLDER

BACKGROUND OF THE INVENTION

1. Field of the Invention

The present invention relates to fishing accessories. More particularly, the present invention relates to a fishing tackle holder which is mountable on the handle of a fishing rod or on the rod shaft.

2. Description of the Related Art

A sport fisherman may at times wish to travel light and may not wish to carry a full tackle box on a fishing expedition. In addition, when taking breaks from the actual fishing, as when moving to a new locations, a fisherman may wish to store a lure or other fishing tackle in a safe place where it will not catch upon plants, persons, clothing or other tackle. The fisherman may then wish to store a lure while it is still attached to the line on the rod.

Most fisherman have a variety of rod types within their tackle collections for use in different fishing applications. The fisherman may wish to have a lure holding device at his disposal but may not wish to have a rod shaft mounted holder interfering with the action, or the appearance and finish, of the particular rod shaft he is using.

Numerous prior art devices have been suggested in an effort to solve these problems.

Sitec, U.S. Pat. No. 2,225,438, discloses a container for fishing rods having two saddle-like containers straddling a rod. A hinge connects the containers and includes two elements which act as spring sections to keep the apparatus on the fishing rod.

Reynolds, U.S. Pat. No. 2,767,502, discloses a rod-mountable transparent case for fish lures which is usable to protectively hold a fish lure during shipment, to form a display case to assist its sale, and to constitute a protective case between uses or during storage. The case of Reynolds includes a pair of case members which are hingedly connected along edges thereof, and they close upon a rod by means of indentations provided in the edges of case members.

Hall, U.S. Pat. No. 3,449,851, discloses a pole mounted fish hook holder and guard in which the hook support and guard are movably disposed within the cavity of a molded plastic body. A removable hinge clip or coupling member is used to clip the plastic body to a fishing pole.

Peterson, U.S. Pat. No. 4,203,245, discloses a fishing lure holder in which a clip is adapted to engage and be frictionally secured on a fishing rod. A flexible plastic sheet extends outwardly from the clip and may be wrapped around a lure and then attached to the opposite side of the clip. The holder of Peterson is open at the top and bottom thereof.

Deutsch et al, U.S. Pat. No. 4,452,003, discloses a storage case for fish hooks including a pair of hingedly connected housing halves to allow a line to pass therethrough. Anchor tabs having keyhole-shaped recesses are provided in edges portions of the housing halves for snap-anchoring engagement on a fishing rod line guide.

While the above-mentioned patents do disclose various types of rod shaft-mountable fish hook storage containers, the need still exists in the art for a rod-mountable accessory holder which may be utilized in a variety of positions on the rod, depending on the type of equipment utilized by the fisherman.

None of the above-patents teach, as does the present invention, the mounting of a fishing tackle holder directly on a fishing rod handle itself, which allows quick and easy access thereto without manipulating latches or fasteners. Further, a device according to the present invention will not interfere with the action of the rod shaft and fishing line during the presentation of the lure and the retrieval of the fish, as may the known devices.

Where the rod shaft-mounted lure holder is desired, the present invention may be utilized in substantially any orientation on the rod shaft, unlike the above devices, to select that position which best meets the needs of the equipment performance, whatever the variety of rod and reel being used.

SUMMARY OF THE INVENTION

A rod mountable fishing tackle holder in accordance with the present invention comprises:
a substantially tubular main body the body having:
(a) at least one longitudinal wall defining a longitudinal bore formed therein, the bore capable of receiving fishing tackle, and
(b) a slit formed through a longitudinal wall of the body for accommodating the passage of at least one portion of fishing tackle through the slit.

Further, attachment means may be provided to allow for releasable mounting of the tackle holder on the rod shaft for alternative placement of the tackle holder. Alternatively, the tackle holder may be formed integrally with the rod handle during manufacture if a non-removable tackle holder is desired. The tackle holder is preferably formed of transparent material, but may also be opaque and still allow easy viewing of the tackle stored by the holder due to the open design and carrying methods provided by the tackle holder. Also, due to the open design the lures held therein will air dry and not rust.

The tackle holder according to the present invention can be attached in a variety of locations on a variety of rod and reel styles, providing for suitable attachment to a fisherman's entire rod and reel collection. The device is easily manipulated for storage of tackle and is economical to manufacture since it has no intricate latches, hinges, or fasteners to be added.

For a more complete understanding of the present invention, reference is made to the following detailed description section, which should read in conjunction with the accompanying drawings. Throughout the following description and in the drawings, identical reference numbers are used to refer to the same component shown in multiple figures of the drawings, in which:

BRIEF DESCRIPTION OF THE DRAWINGS

FIG. 1 is a side view of a fishing rod with an apparatus in accordance with the present invention mounted in various locations thereon, and sectioned for ease of understanding.

FIG. 2 is a side view of a fishing tackle holder according to the present invention.

FIG. 3 is an end view of the device of FIG. 2.

FIG. 4 is a side view of a fishing rod handle incorporating the present invention.

FIG. 5 is a perspective view of a second embodiment of the present invention.

FIG. 6 is a sectional view taken along the line 6—6 of FIG. 5.

FIG. 7 is a view of an alternative closed end for the second embodiment.

FIG. 8 is a side view of a third embodiment of the present invention as formed integrally with a fishing rod handle.

DETAILED DESCRIPTION OF THE PREFERRED EMBODIMENT

Referring to FIG. 1, a fishing rod 10 is shown in side view, the fishing rod 10 being illustrated as a conventional closed face, spin-cast, rod and reel construction. A fishing tackle holder 30 in accordance with the present invention is shown mounted on a fishing rod handle 20 at the base of the rod 10 and in various other orientations mounted on the rod shaft 15.

The tackle holder 30 includes a substantially tubular main body 34 with a hollow passage, or bore, 33 formed longitudinally therethrough providing an attachment means for receiving therein the generally cylindrical handle 20 of a fishing rod 10. It will be appreciated that the cylindrical main body 34 may be formed in various other cross sectional shapes within the spirit of the present invention, for example square, octagonal, ovoid; and may also be contoured along its length, if necessary, to mate closely with the rod handle shape.

A slit 35 is formed in the main body 34 parallel to the longitudinal axis of the tackle holder 30 thereby defining two side arms 37, 38 of the main body. The slit will receive parts of fishing tackle, illustrated as a lure 21 or line 22. It is preferable that the tackle holder 30 be made of a resilient material so that the slit 35 is generally held closed by the bias of the opposite side arms 37, 38. This bias seeks to close the hollow passage 33 and thereby will allow the side arms 37, 38 to frictionally engage the tackle 22, to secure its placement in the tackle holder 30. The holder 30 should have adequate surface hardness to prevent the hooks 23 from easily engaging and snagging the main body 34. The side arms 37, 38 preferably end at the slit 35 in gently rounded tips 40, 41 so as to cause no damage to a fishing line or lure part passing therethrough. Extrusion of the main body 34 with rounded side arm tips 40, 41, or formation of the slit by heat cutting would therefore be preferable to abrasive cutting by a saw to form the slit 35. Alternatively, resilient members may be attached on the main body around the slit 35 if a non-resilient material is used to form the main body 34.

In a preferred embodiment the main body is formed of a transparent material although an opaque body would still allow easy viewing of the tackle 21, 22 held by the tackle holder 30 due to its open design and its ability to hold a lure body 24 above the main body 34. Also, the open design will allow the lure held therein to air dry and not rust.

As seen in FIG. 2, the main body 34 has a transversely planar end 43 and an obliquely planar end 44 with a long side 46 and a short side 47. The long side 46 and the short side 47 may be arranged as desired over the rod handle 20 so as to most comfortably conform to the grip of the fisherman on the rod handle 20, or alternatively, the long side 46 may be left to extend over the end of the rod handle 20 to facilitate the placement of a fishing lure 21 therein as seen in FIG. 1. Further, means for attachment of the tackle holder 30 to the fishing rod handle 20 may be provided internally on the tackle holder, i.e., within the cylindrical passage 33, by cooperating hook and pile fabric fastener halves (Trademark: VELCRO) 49, 50. The hollow passage 33 carries one half of the fabric fastener 49 while the rod handle 20 carries the cooperating half of the fabric fastener 50. It will be appreciated that these fabric fasteners may be unnecessary to a secure placement of the tackle holder 30 onto the rod handle 20, dependant upon the relative diameters of the rod handle 20 and the hollow passage 33.

Further, means for attachment of the tackle holder 30 to the fishing rod shaft 15, may be provided externally on the tackle holder 30, i.e., on the body side opposite the hollow cylindrical passage 33, as by resilient rod shaft clips 51 located on the main body 34. The rod shaft clips 51, have varying diameters and are located at varying distances along the side arms 37, 38 to provide for placement of the tackle holder at various points along the fishing rod shaft 15, since, ordinarily, the fishing rod shaft 15 will have a decreasing diameter from base to tip.

The rod shaft clips 51 may be formed integrally with the main body 34 such as by extrusion of the elements from a single die. Alternatively, the rod shaft clips may be attached to the side arms 37, 38 as separate bodies by adhesives or the like.

As seen in FIG. 5, a second embodiment of the holder 30 is provided with an enlarged slit 53 through the main body 34 and a closed end 55 on the main body 34. The enlarged slit 53, hereinafter called a slot 57, extends at least partially through the closed end 55. The slot 57 will thus allow the fishing line 22 to enter the hollow passage 33 while remaining tied to a fishing lure 21, which may then also enter the hollow passage 33 through an open end 59 of the holder 30. The slot 57 may extend completely, as in FIG. 5, or partially, as in FIG. 7, through the closed end to allow the line 22 to pass out of the holder 30 once the lure 21 attached thereto is placed within the main body 34.

Means for attachment of the holder 30 to the fishing rod 10 may include the previously discussed VELCRO fasteners, rod shaft clips, integral mounting with the handle, etc.

As seen in FIG. 8, a third embodiment of the holder 30 is integrally formed with the fishing rod handle 20 on that side of the handle 20 to which the fishing reel 61 is attached and forward of the gripping surface 63 of the handle. The third embodiment is substantially ovoid or bullet-shaped so as to not interfere with the standard types of rod gripping surfaces or manipulation of the reel 61. Such placement of the holder 30 further does not interfere with the placement of the rod shaft 15 within the handle 20. It will be appreciated that the holder 30 could be equally well placed on that side of the handle 20 opposite the side on which the reel 61 is mounted.

In use the tackle holder 30 may be attached to the fishing rod 10 by fitting the cylindrical passage 33 over the rod handle 20 or alternatively may be attached at various places along the rod shaft 15 by placing the appropriately diametered resilient rod shaft clip 51 over the rod shaft 15. It will be appreciated that the tackle holder 30 may thus be placed in an almost limitless variety of orientations on the rod handle 20 or rod shaft 15, including having the tackle holder 30 act as a line guide by passing the fishing line 22 through the hollow passage 33. Thus, the tackle holder is suitable for a variety of fishing rod and reel configurations and may be easily switched from one fishing rod to another. Should a more permanent attachment of the fishing tackle holder 30 to the rod handle be desired, the holder 30 may be formed integrally with the rod handle 20 during manufacture to form a tackle holder 30 permanently located on the rod handle 20 as illustrated in FIGS. 4 and 8.

To secure fishing tackle 21, 22 to the first embodiment of the tackle holder 30, the fisherman has merely to place a grippable portion of the tackle within the slit 35 to thereby be held between the side arm tips 40, 41. The tackle holder 30 is particularly useful for placing the pointed ends of lure hooks 23 in a contained position where the hooks 23 will not impale or snag any person or object. This is done by passing the shank 24 of the lure hook 23 into the slit 35, leaving the pointed heads of the hook 23 within the hollow passage 33 and the lure body 24 above the tackle holder 30. Alternatively, the fishing line 22 may be placed in the slit 35 and any attached lure 21 merely rested within the hollow passage 33. It will be appreciated that the tackle holder 30 is always open and ready to receive or release tackle 21, 22 in any position without having to fumble with latches or fasteners.

In the second embodiment, the line 22 is placed through the slot 57 into the hollow passage 33, the lure 21 is placed within the passage 33, and the fishing reel is used to tension the line 22 to hold the lure 21 against the closed end 55 of the holder 30. As seen in FIG. 5, it will be noted that the slot width in the closed end should allow passage of the lure eyelet 65 therethrough, yet be too narrow to allow passage of the lure body 24 therethrough.

The fact that the tackle holder 30 is mountable through the hollow cylindrical passage 33 formed therein directly on to the handle 20 of the fishing rod 10 or as an integral part of the handle 20 allows for a secure attachment to the rod 10. Thus, even in a busy and active day of fishing in which the fishing pole 10 may be subjected to rough handling, the apparatus 30 of the present invention will not become dislodged from its attachment to the fishing pole 10. Although the present invention has been described herein with respect to the specific embodiments hereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed is:

1. In combination a fishing tackle holder and a spinning reel fishing rod comprising:
   (a) a the fishing tackle holder for receiving a treble hook comprising a substantially tubular main body, the body having:
      (1) at least one longitudinal wall defining a longitudinal bore for receiving fishing tackle; and
      (2) a slit formed through a longitudinal wall of the body the slit having an enlarged portion for accommodating the insertion and passage of at least a portion of a fishing tackle through the slit and into the interior of the body; and
   (b) a fishing rod having:
      (1) a shaft;
      (2) means for directing a fishing line during reeling and unreeling attached to the shaft;
      (3) a reel seat;
      (4) a spinning reel for dispensing fishing line therefrom, the spinning reel attached to the reel seat;
      (5) a handle, the handle being attached to the reel seat;
   wherein the fishing tackle holder is removably attached at its forward end to the shaft of the fishing rod, and the forward end of the fishing tackle holder is integrally formed with the reel seat of the fishing rod;
   and wherein further both ends of the fishing tackle holder are closed.

2. A fishing tackle holder comprising:
   (a) a substantially tubular main body, the body having;
      (1) at least one longitudinal wall defining a longitudinal bore for receiving fishing tackle;
      (2) a slit formed through at least one longitudinal wall of the body for accommodating the passage of at least a portion of fishing tackle through the slit;
   (b) means for attachment of the tackle holder to a fishing rod handle, comprising one half of a hook-and-pile type fabric fastener located within the longitudinal bore, and a complementary fastener half being located on a fishing rod handle
   wherein the bore is a through bore.

3. The tackle holder of claim 2 wherein the slit is bounded by a resilient material.

4. The tackle holder according to claim 2 wherein: the rod handle is fitting within the longitudinal bore.

5. The tackle holder of claim 2 further comprising : means for attachment of the tackle holder to a fishing rod shaft, the rod shaft attachment means being located on the main body.

6. The tackle holder of claim 2 wherein: the means for attachment of the tackle holder to the fishing rod handle comprises at least one resilient clip located externally on the main body.

7. A fishing tackle holder comprising:
   (a) a substantially tubular main body, the body having:
      (1) at least one longitudinal wall defining a longitudinal bore for receiving fishing tackle;
      (2) a slit formed through a longitudinal wall of the body for accommodating the passage of at least a portion of fishing tackle through the slit;
      (3) a closed end for preventing the escape of fishing tackle through the closed end from the longitudinal bore;
      (4) and an open end communicating with the longitudinal bore; and
   (b) means for attachment of the tackle holder to a fishing rod handle, wherein the means comprises one half of a hook-and-pile fabric fastener located within the longitudinal bore, and a complementary fastener half being located on the fishing rod handle.

8. The tackle holder according to claim 7, wherein: the closed end has formed therein a continuation of the slit through the main body.

9. The tackle holder according to claim 7, wherein: the longitudinal bore has a diameter larger than the rod handle, such that the tackle holder may be removably fitted and retained upon the rod handle.

10. The tackle holder of claim 7 further comprising: means for attachment of the tackle holder to a fishing rod shaft, the rod shaft attachment means being located on the main body.

11. The tackle holder of claim 7, wherein: the means for attachment of the tackle holder to the fishing rod handle comprises at least one resilient clip located externally on the main body.

12. The tackle holder of claim 7 wherein the slit is bounded by a resilient material.

* * * * *